Jan. 5, 1971 S. M. HAZEN ET AL 3,553,153
CURABLE RESIN COMPOSITION CONTAINING A SATURATED MONOOXINANE
COMPOUND, A SOLID POLYANHYDRIDE, WATER AND A SOLUBLE
TERTIARY AMINE; AND METHOD OF PRODUCTION
AND ARTICLE
Filed Jan. 2, 1968

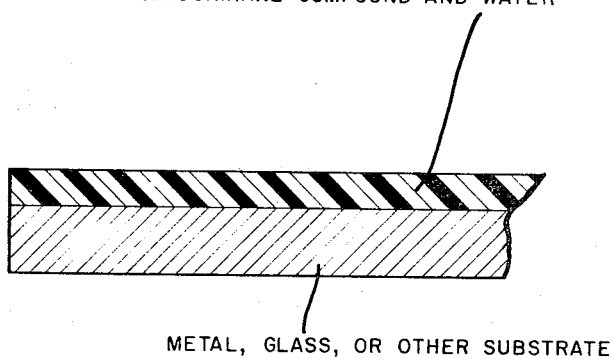

CURED RESIN FROM SOLUTION OF COPOLYMER OF MALEIC
ANHYDRIDE AND A STRAIGHT CHAIN OLEFIN, A LIQUID
MONOOXIRANE COMPOUND AND WATER

METAL, GLASS, OR OTHER SUBSTRATE

INVENTORS
STANLEY M. HAZEN &
WILLIAM J. HEILMAN

United States Patent Office 3,553,153
Patented Jan. 5, 1971

3,553,153
CURABLE RESIN COMPOSITION CONTAINING A SATURATED MONOOXIRANE COMPOUND, A SOLID POLYANHYDRIDE, WATER AND A SOLUBLE TERTIARY AMINE; AND METHOD OF PRODUCTION AND ARTICLE
Stanley M. Hazen, Cheswick, and William J. Heilman, Allison Park, Pa., assignors to Gulf Research & Development Company, Pittsburgh, Pa., a corporation of Delaware
Filed Jan. 2, 1968, Ser. No. 695,150
Int. Cl. C08f 3/02, 3/48
U.S. Cl. 260—29.6    13 Claims

ABSTRACT OF THE DISCLOSURE

Liquid coating and molding compositions are provided which are curable to an infusible resin article or coating of improved (lighter) color. The composition comprises a solution of a saturated monooxirane compound, for example, epichlorohydrin, a solid polyanhydride having succinic anhydride groups (excluding aromatic anhydrides in which the alpha carbon atoms of the anhydride group are included in the aromatic ring) for example, the copolymer of a straight chain alpha-monoolefin and a maleic anhydride; water or methanol; and a soluble tertiary amine such as 3-picoline. The curing rate of the composition is controlled depending on the amount and manner of the water or methanol addition. The composition shows less shrinkage and weight loss during curing compared with the same composition minus the water or methanol. Thus, for example, films and coatings free of lifting and etching are obtained.

---

This invention relates to new compositions capable of being cured to solid infusible resins having excellent physical and chemical properties and improved color and to methods of controlling the curing of these new compositions.

Resinous compositions of many types are known in the art. Of special interest are epoxy resin compositions prepared by the crosslinking of polyepoxides with various crosslinking or hardening agents such as mono or dianhydrides. In many ultimate applications of resins, such as laminating, adhering objects together, encapsulating and filament winding, it is important that the materials cure quickly and the final products have the desired physical and chemical characteristics. Thus, it is important for the curing to occur quickly to reduce volatilization of ingredients and to reduce shrinkage. It is also important to impart some degree of flexibility to the cured resinous products to again prevent shrinkage and cracking of the products. In other instances, it may be important to retard the rate of curing, such as when the uncured resin solution is in an extruding or other machine and there is a temporary breakdown requiring the resinous solution to remain in the machine for a time longer than anticipated or to allow sufficient time to remove the resin from the machine. Other important characteristics are flexural strength and toughness such as impact resistance, or hardness and rigidity where these are required, good heat distortion temperautre properties, smoothness and clarity of films, dimensional uniformity of the end cured product and good adhesion, for these properties are often required. In addition, castings or films having light color are also desirable for many applications. The reaction of a solution of a liquid monooxirane compound with a solid polyanhydride (where the anhydride groups are not directly attached to and form part of an aromatic ring) such as a polyanhydride prepared by the copolymerization of an alpha-olefin and maleic anhydride, gives thermally cured resins which have many of the foregoing properties, but which are deficient in some regards. The thermal reaction is very slow at low temperatures in the range of 0° C. to 50° C. and frequently the use of high temperatures is not possible or is not practical. Tertiary amines which are soluble in the liquid monooxirane-polyanhydride solution can be employed to catalyze the reaction of the anhydride-epoxide groups at low temperatures. There are still times when it is desirable to either increase the curing rate of amine catalyzed systems or to retard the rate of curing once curing has started. In addition, the tertiary amines have been found to impart a dark color to the finally cured resinonus reaction products and it may be desirable at times to obtain finally cured products of improved (little) color using the tertiary amine catalyzed system. In addition, it is desirable to avoid shrinkage with or without concurrent weight loss during curing since such shrinkage and weight loss create built-in undesirable stresses, resulting in such defects as warping, etching and lifting in the case of films or coatings.

It has now been found in accordance with the invention that the inclusion of water or methanol in small amounts dissolved in the monooxirane-polyanhydride solution unexpectedly gives products having improved color properties, and in addition provide products which resist shrinkage and weight loss, aid in the film forming ability of the solution and aid in controlling the rate of curing.

Water is a preferred hydroxyl-containing compound and it has been found quite unexpectedly that water in small amounts increases the rate of curing of the amine catalyzed system while water being used in larger amounts decreases the rate of curing. In all cases products of improved color are obtained.

In accordance with the invention, there is provided a new composition capable of being cured to a solid infusible resin of improved color comprising a liquid or spreadable solution of:

(A) a solid compound containing at least three succinic anhydride groups and less than three conjugated double bonds when one of the conjugated double bonds is between the carbon atoms alpha to the carbonyl groups in a succinic anhydride group;
(B) a monooxirane compound containing as its only functional group a single oxirane oxygen atom;
(C) a soluble tertiary amine; and
(D) a hydroxyl-containing compound selected from the group consisting of water and methanol, wherein the equivalent ratio of (A) to (B) is between 0.5 and 1.5 with component (D) being present in an amount between 0.1 and three weight percent of the solution when (D) is water and in an amount between 0.1 and five weight percent of the solution when (D) is methanol.

The ratio of the anhydride groups of (A) to the oxirane groups of (B) varies over a range between 0.5 and 1.5, and the amount of (C) and (D) are minor amounts with regard to the combined weight of (A) and (B). A possible course of resin forming reaction is illustrated by the following reaction of the hexene-1-maleic anhydride copolymer, epichlorohydrin and water.

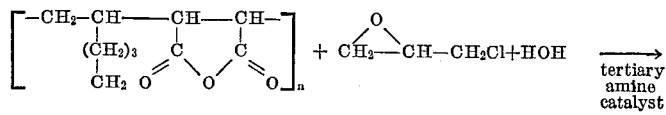

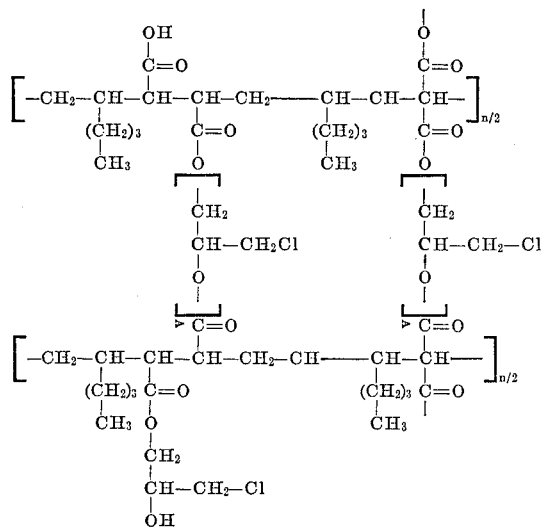

where n and A are integers. The final composition is a network of ester and ether linkages with the possibility of some free carboxyl and anhydride groups remaining depending on the A/E ratio employed.

It is not intended that the invention be limited by the foregoing empirical formula of the polymer structure or by this hypothetical example of the reaction.

The drawing illustrates an embodiment of an article of manufacture comprising a substrate containing a cured coating of the solution of the invention.

One of the components of the composition of this invention is a solid compound containing at least three succinic anhydride groups and less than three conjugated double bonds when one of the conjugated double bonds is between the carbon atoms alpha to the carbonyl groups in a succinic anhydride group. In other words, one of the components of the compositions of this invention is a solid compound containing at least three anhydride groups where the carbon atoms alpha to the carbonyl groups in the anhydride are connected to each other through a bond selected from the group consisting of a single bond and a double bond and wherein said solid compound contains less than three conjugated double bonds when one of the conjugated double bonds is between the carbon atoms alpha to said carbonyl groups. By the term "conjugated double bonds" in this application is meant conjugated carbon-to-carbon double bonds.

It is preferred that in the solid compound component containing at least three succinic anhydride groups, that the carbon atoms alpha to the carbonyl groups in the succinic anhydride be connected to each other through a single bond and that the molecule be free of olefinic or acetylenic unsaturation. The solid compound contains at least three, preferably at least four and usually contains between 8 and 20 succinic anhydride groups per molecule. Usually there are no more than 100 succinic anhydride groups per molecule in the solid compound. In addition, the solid polyanhydride compounds are defined so as to exclude aromatic polyanhydrides where the carbon atoms alpha to the carbonyl groups in the anhydride group are a part of an aromatic ring. Such aromatic polyanhydrides have been found unsuitable to form the compositions of this invention as they are substantially insoluble in the liquid monomeric organic oxirane compound.

The solid polyanhydrides for use in the compositions of this invention can be prepared in any suitable manner. One suitable procedure is to polymerize an unsaturated derivative of succinic anhydride with an olefinic compound. By an unsaturated derivative of succinic anhydride is meant any organic compound comprising a succinic anhydride group and at least one carbon-to-carbon double bond. By a succinic anhydride group is meant the group represented by Formula I below:

Formula I

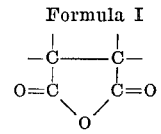

The carbon-to-carbon double bond can occur in the Formula I above between the carbon atoms alpha to the carbonyl groups in the succinic anhydride group or the carbon-to-carbon double bond can occur in the groups attached to the carbon atoms alpha to the carbonyl groups in the succinic anhydride group. For example, the solid polyanhydrides can be prepared by the homopolymerization of succinic anhydride derivatives represented by the general Formulas II through VII below:

Formula II

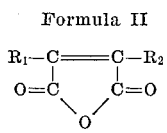

where $R_1$ is a member selected from the group consisting of hydrogen, halogen, a hydrocarbon radical and a substituted hydrocarbon radical; and $R_2$ is selected from the group consisting of hydrogen and halogen atoms. By the term "hydrocarbon radical" in this application is meant any group of atoms consisting of carbon and hydrogen, such as alkyl, cycloalkyl, aryl, alkaryl, and aralkyl. Unless otherwise indicated, the term "alkyl" is meant to include only saturated groups. The term "hydrocarbon radical" is therefore intended to substantially exclude olefinic unsaturation in the radicals unless otherwise indicated. By the term "substituted hydrocarbon radical" in the specification is meant one where one or more atoms in the hydrocarbon radical have been exchanged for a halogen; —C≡N; —OR group where R is any hydrocarbon radical as defined above; or

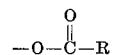

where R is any hydrocarbon radical as defined above. Examples of suitable polyanhydride precursors having the above formula are as follows:

maleic anhydride;
methylmaleic anhydride;
ethylmaleic anhydride;
hexylmaleic anhydride;
phenylmaleic anhydride;
benzylmaleic anhydride;
dibromomaleic anhydride;
cyanoethylmaleic anhydride;
chloromaleic anhydride;
pentadecylmaleic anhydride;
octacosylmaleic anhydride;
cyclohexylmaleic anhydride;
diphenylmaleic anhydride;
naphthylmaleic anhydride;
orthotolylmaleic anhydride;
bromochloromaleic anhydride;
4-propyl-8-methyl-eicosylmaleic anhydride;
4-propyl-1-naphthylmaleic anhydride;
4-cyclohexyltridecylmaleic anhydride;
paraethylphenylmaleic anhydride;
1-chloro-2-methylmaleic anhydride;
1-bromo-2-heptylmaleic anhydride;
1-chloro-2-heptadecylmaleic anhydride;
1-chloro-2-heptacosylmaleic anhydride;
1-chloro-2-cyclohexylmaleic anhydride;
1-bromo-2-phenylmaleic anhydride;
1-chloro-2-p-decylphenylmaleic anhydride;
1-chloro-2-heptylmaleic anhydride;
chloromethylmaleic anhydride;

3-bromooctylmaleic anhydride;
phenoxymethylmaleic anhydride;
phenoxydocosylmaleic anhydride;
6-pentanoxyoctylmaleic anhydride;
1-chloro-2(2-phenoxyethyl)maleic anhydride;
4-cyanoonylmaleic anhydride; and
1-bromo-2-(3-cyanohexyl)maleic anhydride;

Formula III

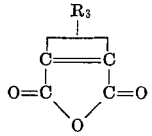

where $R_3$ is selected from the group consisting of a divalent hydrocarbon radical having between 2 and 5 cyclic carbon atoms and a substituted divalent hydrocarbon radical having between two and five cyclic carbon atoms. The total number of carbon atoms in $R_3$ can be between 3 and 36 and is preferably between 4 and 16. Examples of suitable polyanhydride precursors having the above Formula III are as follows:

1,2-dicarboxyliccyclobutene anhydride;
1,2-dicarboxyliccyclopentene anhydride;
1,2-dicarboxyliccyclohexene anhydride;
1,2-dicarboxyliccycloheptene anhydride;
1,2-dicarboxylic-4-chlorocyclopentene anhydride;
1,2-dicarboxylic-4-methylpentene anhydride;
1,2-dicarboxylic-4-octylcyclohexene anhydride;
1,2-dicarboxylic-5-octacosylcycloheptene anhydride;
1,2-dicarboxylic-5-cyanocyclohexene anhydride;
1,2-dicarboxylic-4-pentyl-5-octylcyclohexene anhydride; and
1,2-dicarboxylic-4-(2-chloropentyl)-cyclohexene anhydride.

Formula IV

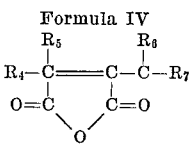

where $R_4$, $R_5$, $R_6$ and $R_7$ can be the same or different and are selected from the group consisting of hydrogen, halogen, a hydrocarbon radical and a substituted hydrocarbon radical. Examples of suitable polyanhydride precursors having the above Formula IV are as follows:

itaconic anhydride;
1,2-dicarboxylic-pentene-2 anhydride;
1,2-dicarboxylic-octene-2 anhydride;
1,2-dicarboxylic-tetradecene-2 anhydride;
1,2-dicarboxylic-eicosene-2-anhydride;
1,2-dicarboxylic-4-methyloctene-2 anhydride;
1,2-dicarboxylic-octadecene-2 anhydride;
2,4-dimethyl-3,4-dicarboxylic-pentene-2 anhydride;
1,2-dimethyl-1,2-dicarboxylic-octene-2 anhydride;
1,2-dicarboxylic-3-cyanohexene-2 anhydride; and
1,2-dicarboxylic-4-bromoeicosene-2 anhydride.

Formula V

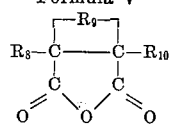

where $R_8$ and $R_{10}$ can be the same or different and are selected from the group consisting of hydrogen, halogen, a hydrocarbon radical, and a substituted hydrocarbon radical; and $R_9$ is a member selected from the group consisting of an unsaturated divalent hydrocarbon radical having between 3 and 5 carbon atoms wherein the unsaturation occurs between any two adjacent cyclic carbon atoms. The total number of carbon atoms in $R_9$ can be between 3 and 36 and is preferably between 4 and 10. Compounds having the structure according to Formula V above can be prepared by the Diels-Alder reaction between a conjugated diene and maleic anhydride. For example, cyclopentadiene and maleic anhydride react to form Nadic anhydride. Castor oil also reacts with maleic anhydride to form adducts corresponding to Formula V. Examples of other suitable compounds for preparing the polyanhydrides having the above Formula V include:

bicyclo(2.2.1)5-heptene-2,3-dicarboxylic anhydride;
cis-4-cyclohexene 1,2-dicarboxylic anhydride;
7-oxabicyclo(2.2.1)5-heptene-2,3-dicarboxylic anhydride;
4-methyl-4-cyclohexene-1,2-dicarboxylic anhydride; and
2-styryl-5-phenyl-1-cyclohexene-3,4-dicarboxylic anhydride.

Formula VI

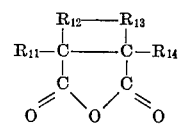

where $R_{12}$, $R_{13}$, and $R_{14}$ can be the same or different and are selected from the group consisting of hydrogen, halogen, a hydrocarbon radical, and a substituted hydrocarbon radical; and $R_{11}$ is a member selected from the group consisting of an unsaturated hydrocarbon radical and an unsaturated substituted hydrocarbon radical. Examples of suitable compounds suitable for preparing the solid polyanhydride having the above formula are as follows:

propenylsuccinic anhydride;
butenylsuccinic anhydride;
hexenylsuccinic anhydride;
isopropenylsuccinic anhydride;
dodecenylsuccinic anhydride;
eicosenylsuccinic anhydride;
octenylsuccinic anhydride;
octadecenylsuccinic anhydride;
1-dodecenyl-2-chlorosuccinic anhydride;
1,1-dipropyl-2-methyl-2-propenylsuccinic anhydride; and
1-octyl-1-bromo-2-butyl-2-dodecenylsuccinic anhydride.

Formula VII

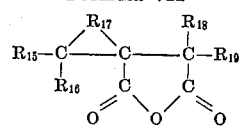

where $R_{15}$, $R_{16}$, $R_{18}$ and $R_{19}$ can be the same or different and are selected from the group consisting of hydrogen, halogen, a hydrocarbon radical and a substituted hydrocarbon radical; and $R_{17}$ is an unsaturated divalent hydrobon radical having four cyclic carbon atoms. The total number of carbon atoms in compounds having the Formula VII above can be between 9 and 40 and is preferably between 9 and 16. These compounds can suitably be prepared by the Diels-Alder reaction between a conjugated diene and itaconic anhydrides.

In the compounds represented by Formulas II, IV, V, VI and VII above, where R, $R_1$, $R_2$, $R_4$, $R_5$, $R_6$, $R_7$, $R_8$, $R_{10}$ through $R_{16}$, and $R_{18}$ and $R_{19}$ are selected from the group consisting of hydrocarbon and substituted hydrocarbon radicals, they can have between 1 and 30 and preferably between 1 and 15 carbon atoms. The total number of carbon atoms per molecule for any particular compound represented by Formulas II and IV through VII can be between 4 and 40 and preferably between 4 and 20.

The solid polyanhydrides can be prepared by the copolymerization of an unsaturated succinic anhydride compound such as defined above with certain organic monoolefinic compounds. For example, the unsaturated succinic anhydride compounds can be copolymerized with olefinic compounds as represented by the general Formula VIII below:

Formula VIII

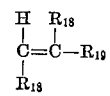

where $R_{18}$ is hydrogen or halogen and $R_{19}$ is a straight chain alkyl or halogenated alkyl radical having from 4 to about 14 carbon atoms, more preferably from 4 to about 8 carbon atoms.

The preferred polyanhydrides or copolymers are those prepared by the copolymerization of maleic anhydride with an alpha-olefinic hydrocarbon having between 6 and 14 carbon atoms per molecule, preferably between 6 and 10 carbon atoms per molecule.

It is understood that the term "olefin" is meant to include mixtures of monoolefins such as those obtained by the thermal or catalytic cracking of petroleum stocks. It is desirable that only one olefinic bond per molecule be present in the anhydride or the olefin, since more than one double bond per molecule promotes gel formation and internal crosslinking. Minor amounts of diolefins, on the order of two percent or less, can, however, be tolerated in the anhydride and olefin.

Examples of olefin compounds or mixtures of olefins suitable to form the solid polyanhydride components of the compositions of this invention include:

1-hexene;
1-heptene;
1-octene;
1-nonene;
1-decene;
5-chlorohexene-1;
1-undecene;
1-dodecene;
1-tridecene; and
1-tetradecene.

One possible structure of the copolymer of hexene-1 and maleic anhydride is as follows:

Formula IX

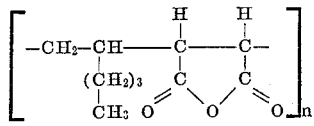

wherein $n$ is from 2 to about 100, or higher, and preferably from 2 to about 30. The foregoing assumes no additional polymerization of like monomers, which of course can take place with suitable monomers and conditions. It is to be understood that either or both of the terminal groups in the foregoing formula may be derived from any component of the reaction mixture.

A more general empirical formula, is as follows:

Formula X

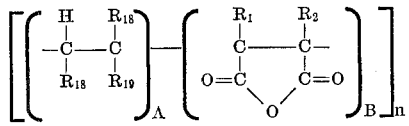

wherein $R_1$, $R_2$, $R_{18}$ and $R_{19}$ have the significance given above, $n$ is an integer of from 2 to about 100, A is from 1 to about 100, and B is from 1 to about 100 or more, preferably from 2 to about 30. It is to be understood that either or both of the terminal groups in the foregoing formula may be derived from any component of the reaction mixture.

In the copolymerization of the unsaturated succinic anhydride compounds with the olefin compounds as defined, at least three unsaturated succinic anhydride molecules must, of course, be incorporated in each polyanhydride molecule in order to produce a solid polyanhydride having at least three succinic anhydride groups therein.

The copolymerization can be conducted in any suitable manner. One suitable copolymerization procedure involves contacting the olefinic compound with the anhydride in a suitable solvent in the presence of a free radical producing catalyst, such as a peroxide. The ratio of the olefinic compound to the anhydride compound will depend to a large extent on the specific olefins and anhydrides employed. For example, for the copolymerization of aliphatic mono-alpha-olefins and maleic anhydride, the ratio of olefin to anhydride is desirably between about 1:1 and 3:1.

The temperature at which the copolymerization occurs is not critical and can generally vary between about 25° and 100° C. with a preferred reaction temperature between about 65° and 85° C. The lower limit on reaction temperature will depend to a large extent on the catalyst employed. However, most free radical producing catalysts, such as the peroxides and others described below, are effective at temperatures as low as 25° C. unless a promoter, such as a ferrous, silver, sulfate or thiosulfate ion, is used in which case much lower temperatures, i.e., −80° C., can be employed. The upper reaction temperature is determined by the boiling point of the components of the reaction mixture and the predominance of unwanted side reactions.

The reaction pressure should be sufficient to maintain the solvent in the liquid phase. Increased pressure, however, in addition to being an added expense, also promotes unwanted side reactions, such as polymerization of the olefinic compound. Pressures can therefore vary between about atmospheric and 100 p.s.i.g. or higher, but the preferred pressure is atmospheric.

The copolymers can be produced in any suitable solvent which at least partially dissolves both of the reacting components. Suitable solvents include, for example:

n-pentane;
n-hexane;
n-octane;
methylene chloride;
tetrahydrofuran;
di-isopropyl ether;
carbon tetrachloride;
cyclohexane;
methylcyclohexane;
n-propylacetate;
toluene;
benzene;
ethylbenzene;
cumene;
xylene;
ethyl-n-butyrate
tetrachloroethylene;
di-n-butylether;
n-amylacetate;
anisole;
cyclohexanone;
bromobenzene;
methylorthotolylether;
acetone;
methylethylketone; and
ethylbenzylether.

The catalyst to employ can be any free radical producing material well known in the art. Preferred catalysts are the organic peroxides, such as benzoyl, lauryl and tertiary butyl peroxide. Other suitable free radical producing materials include substituted azo compounds, such as alpha-alpha'-azobis-isobutyronitrile.

The molecular weight of the polyanhydride component of the compositions of this invention can vary over a wide range. The inherent viscosity (which is a measure of molecular weight) of five grams of the polyanhydride per deciliter of acetone at 77° F. can suitably be between about 0.01 and 2 or more, and is preferably between 0.02 and 0.95 deciliters per gram (ASTM Test D–1601 with changes noted above).

The composition of this invention also comprises a liquid monooxirane compound containing as its only functional group a single oxirane oxygen atom. By a functional group is meant a group such as an oxirane oxygen atom which would participate in the anhydride-monoepoxide crosslinking reaction, i.e., combine chemically with the anhydride, such as for example —OH, —SH, and —NH groups. By an oxirane oxygen atom is meant an oxygen atom directly connected to two carbon atoms, which carbon atoms are connected to each other, i.e.,

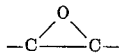

A monooxirane compound is frequently termed a monoepoxide. One preferred class of saturated (i.e., containing no olefinic unsaturation) liquid organic monooxirane compounds can be represented by the general Formula XI below:

Formula XI

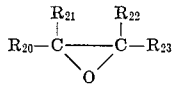

wherein $R_{20}$, $R_{21}$, and $R_{22}$ are selected from the group consisting of hydrogen, a hydrocarbon radical as defined above in connection with Formula II, a substituted hydrocarbon radical as defined above and —OR, where R is any hydrocarbon radical as defined above; and $R_{23}$ is selected from the group consisting of a hydrocarbon radical as defined above, a substituted hydrocarbon radical as defined above and —OR, where R is any hydrocarbon ardical as defined above.

The total number of carbon atoms in the monoepoxide compound should be such that the compound is liquid at about room temperature. In general, the number of carbon atoms is suitably between 3 and about 20 and preferably between about 3 and 10 per molecule. Thus, $R_{20}$, $R_{21}$, $R_{22}$ and $R_{23}$ suitably can have between 1 and 18 carbon atoms when $R_{20}$, $R_{21}$, $R_{22}$ and $R_{23}$ are hydrocarbon radicals with the sum of the carbon atoms in $R_{20}$, $R_{21}$, $R_{22}$ and $R_{23}$ being preferably between 1 and 18.

The preferred saturated oxirane compounds are the so-called terminal monoepoxides which are represented by the above Formula XI when $R_{20}$ and $R_{21}$ are hydrogen. When terminal epoxides are used, it is preferred that $R_{23}$ be selected from the group consisting of phenyl, —OR where R is as defined above, saturated aliphatic radicals having between 1 and 18 carbon atoms, and halogen substituted alkyl groups.

As noted above, the oxirane compound must be liquid at room temperature in order to dissolve the solid polyanhydride compounds defined above. Examples of suitable oxirane compounds include:

methyl glycidyl ether;
butyl glycidyl ether;
octyl glycidyl ether;
phenyl glycidyl ether;
allyl glycidyl ether;
isopropyl glycidyl ether;
1,2-epoxy propane;
1,2-epoxy butane;
1,2-epoxy hexane;
1,2-epoxy decane;
1,2-epoxy-7-propyldecane;
1,2-epoxy-5-chlorododecane;
2,3-epoxy-2-phenylhexane;
1,2-epoxy-2-butoxypropane;
1,2-epoxy dodecane;
1,2-epoxy octadecane;
1,2-epoxy eicosane;
1,2-epoxy triacontane;
1,2-epoxy tetracontane;
glycidyl benzoate;
glycidyl acetate;
limonene oxide;
cyclohexene oxide;
7,8-epoxyhexadecane;
3,4-epoxyhexane;
1,2-epoxy-3-chlorobutane;
monoepoxidized soy bean oil;
1,2-epoxy-2-phenoxypropane;
2,3-epoxy-2,3-dimethylbutane;
2-propyloctyl glycidyl ether;
3-methylpent-1-ene glycidyl ether;
1,3-epoxy-2-chloropropane (epichlorohydrin);
2,3-epoxy-2-4-dimethyl-4-chlorobutane;
1,2-epoxy-3-bromopropane (epibromohydrin);
monoepoxidized 2-ethylhexyl tallate; and
glycidyl-para-methylbenzoate.

The most preferred oxirane compounds are styrene oxide, epichlorohydrin, 1,2-epoxy-2-phenoxypropane, 1,2-epoxy-2-butoxypropane, and epoxidized straight chain alpha-monoolefins having between 3 and 20 carbon atoms per molecule such as 1,2-epoxypropane, 1,2-epoxybutane and 1,2-epoxyoctane, 1,2-epoxydodecane, and 1,2-epoxyeicosane.

It has been found that the curing or crosslinking reaction can be accelerated by the use of various metal salts. Several Friedel-Crafts type salts, such as ferric chloride and lithium chloride, while accelerating the production of a solid product, are undesirable in that they are insoluble in the polyanhydride-monoepoxy system and, in addition, results in a solid which is softer than desired. Other materials, such as $BF_3$ complexes, salts of tertiary amines, picolinic acid and concentrated $NH_4OH$, while soluble in the monoepoxide system are undesirable in that the cured products are softer than desired.

Primary and secondary amines, concentrated HCl, NaOH and oxalic acid either do not function at all as accelerators or react with a polyanhydride-monoepoxide to form undesirable products.

It has been found that soluble tertiary amines as a class are unique in accelerating the curing of the compositions of this invention to solids of desired hardness. One suitable class of tertiary amines can be represented by the general formula:

Formula XII

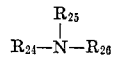

where $R_{24}$, $R_{25}$ and $R_{26}$ can be the same or different and can be selected from the group consisting of a hydrocarbon radical as defined above having between 1 and 37 carbon atoms, and a substituted hydrocarbon radical as defined above having between 1 and 37 carbon atoms; and wherein the sum of the carbon atoms in $R_{24}$, $R_{25}$ and $R_{26}$ includes both saturated and unsaturated groups. Examples of suitable tertiary amines having the above Formula XII include:

trimethylamine;
triethylamine;
N,N-dimethylaniline;
tri-n-hexylamine;
tri-n-heptylamine;
tri-n-phenylamine;
tri-n-decylamine;
N,N-diethylaniline;
tri-n-butylamine;
tri-pentylamine;
tridodecylamine;
N,N-dimethylbenzylamine;
dimethylaminomethylphenol;
N,N-diethyl-1-naphthylamine;
p-bromo-N,N-dimethylaniline;
p-bromo-N,N-diethylaniline;
p-chloro-N,N-diethylaniline;
N,N-diphenylmethylamine;
N,N-diethylallylamine;
N,N-di-n-propylaniline;
N,N-diethyl-o-toluidine;
N,N-diethyl-p-toluidine;
N-ethyl-N-methylaniline;
N,N-dimethyl-m-toluidine;
N,N-diethyl-m-toluidine;

tri-n-propylamine;
tri-isopentylamine;
trioctylamine;
N,N-diphenylmethylamine;
meta-diethylaminophenol;
N,N-dimethyloctadecylamine;
N,N-dimethylcyclohexylamine;
N-methyl-N-phenylbenzylamine;
tridimethylaminomethylphenol;
N,N-dimethyl-1-naphthylamine;
alpha-methylbenzyldimethylamine;
N,N-dimethyl-p-nitrosoaniline;
dimethylaminoethyl methacrylate;
N,N-diethyl-2,5-dimethylaniline;
N,N-diethyl-2,4-dimethylaniline;
N,N-alpha-trimethylbenzylamine;
N,benzyl-N-ethyl-m-toluidine; and
N,N-dimethyl-2-ethylhexylamine.

Pyridines are also suitable as accelerators and can be represented by Formula XIII below:

Formula XIII

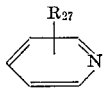

where $R_{27}$ can be selected from the group consisting of hydrogen, a hydrocarbon radical as defined above having between 1 and 10 carbon atoms, and a substituted hydrocarbon radical as defined above having between 1 and 10 carbon atoms; and wherein the term "alkyl" includes both saturated and unsaturated groups. Examples of suitable tertiary amines having the above Formula XIII include:

pyridine;
3-ethylpyridine;
2-benzylpyridine;
4-phenylpyridine;
2-chloropyridine;
2-allylpyridine;
4-ethylpyridine;
2-isopropylpyridine;
3-bromopyridine;
2-chloropyridine;
vinylpyridine; and
3-picoline.

While the monosubstituted pyridines are preferred, the more highly substituted pyridines can also be employed, such as for example:

3,5-dicyanopyridine;
3,5-dimethylpyridine;
3-cyano-4-methylpyridine; and
2,4,6-trimethylpyridine.

Examples of other suitable tertiary amines include:

quinazoline;
triethylene diamine;
quinoxaline;
naphthyridine;
phthalazine;
phenotriazine;
acridine;
N,N-dimethyl-m-nitroaniline;
N,N-diethyl-m-phenetidine;
N,N-diethyl-o-nitroaniline;
pyrido[3,2-b]pyridine;
pyrido[4,3-b]pyridine;
1,2,4-benzotriazine;
phenazine;
N,N-diethyl-3,4-dinitroaniline;
N,N,N',N'-tetramethylmethylene diamine;
N,N,N',N'-tetramethyl-1,3-butane diamine; and
N,N,N',N'-tetraethylene diamine.

The amount of the tertiary amine accelerator to employ is not critical, amounts on the order of about 0.1 and 20 parts of amine catalyst per 100 parts of polyanhydride-monoepoxide solution being satisfactory. The preferred range of accelerator concentration is 0.5 and 5 parts of amine catalyst per 100 parts of polyanhydride-monoepoxide solution. The more amine catalyst that is used, the faster the rate of cure, and the curing is an exothermic reaction. When the higher concentration of amine is employed, it is preferred that means also be employed to remove the exothermic heat of reaction to avoid any possible charring of the product. For example, one suitable method to remove the heat of the curing reaction more quickly is to form the reaction mixture into a film.

The use of a tertiary amine accelerator and particularly the use of the alkyl substituted anilines and pyridines results in much faster cures.

The method of addition of the tertiary amine accelerators is critical. They must be added to the mixture of anhydrides and monoepoxide after the anhydrides are dissolved in the monoepoxide, since it normally takes longer for the solution of the anhydrides in the monoepoxide than for the amine accelerators to harden the mixture. Consequently, if the amine is added first to the monoepoxide and the anhydrides added to this mixture, the composition may harden before all of the anhydrides are dissolved, and a grainy composition with inferior chemical and physical properties will result.

The prime criteria for the compositions of this invention is the solubility of the solid polyanhydride and of the hydroxyl-containing compounds in the liquid monoepoxide to form a solution which is liquid at about room temperature, i.e., at temperatures between about 10° and 30° C. A solution is required in order to obtain a hard, infusible resin which is clear, nongrainy, and has excellent solvent resistance properties together with good flexural strength and heat distortion temperatures. The time for solution of the polyanhydride in the monoepoxide varies depending on the ratio of the materials in the mixture, the temperature and, of course, the nature of the materials themselves. Thus, while the polyanhydride to epoxide ratio ($A/E$ ratio) in the final mixture can vary between about 0.5 to 1.5, faster solution of the polyanhydride will occur at the lower $A/E$ ratios. More will be said of this $A/E$ ratio below. In addition, it is sometimes desirable to heat the monoepoxide and the polyanhydride with or without the hydroxyl-containing compound to effect a faster solution. This heating is, of course, in the absence of the tertiary amine. Since the use of increased temperatures promotes crosslinking and solidification, the temperatures during this premixing are suitably maintained below about 90° C. and preferably between 50° and 60° C. In any event, the solution on cooling to room temperature would still be liquid.

The compositions of this invention also comprise a hydroxyl-containing compound selected from the group consisting of water and methanol.

The amount of hydroxyl-containing component to employ depends on whether water or methanol is employed and on the extent of the effect desired. The use of either water or methanol with the tertiary amine catalyzed system results in the production of cured products having lighter colors. Thus, the use of tertiary amines results in dark colored products when dry components which are alcohol free are employed. As water or methanol is added to the compositions, lighter to colorless products are produced depending on the amount of water or methanol employed.

Further, the addition of water or methanol can be employed as a means of controlling the curing rate of the resinous compositions. By curing rate is meant the rate at any given temperature for a liquid solution of the components defined above to set to a gel structure which will not flow but which may be still tacky. The addition of methanol in amounts between 0.1 and 5 weight percent based on the combined weight of the polyanhydride and monooxirane components results in curing rates which are increased when the methanol is added and allowed to react before the tertiary amine catalyst is added.

Water can be used to either increase or decrease the rate of curing depending on the amount of water added and its method of addition with certain monooxirane components. Thus, the rate of curing can be increased in all cases where the amount of water is between 0.1 and 1 weight percent of the anhydride-monooxirane solution so long as the water is added and allowed to react in the system before the addition of the tertiary amine. The water can also, of course, be added simultaneously with the tertiary amine, but it has been found that even small amounts of water (0.25 weight percent) added in this manner reduces the curing rate when the monoepoxide is epichlorohydrin but increases the curing rate when the monoepoxide is butylene oxide.

The curing rate is reduced in all cases when the amount of water employed is increased above one weight percent. Color improvement continues, until, at a water level of about three weight percent based on the weight of the polyanhydride-monooxirane solution, the cured product is colorless.

The above compositions can be employed to encapsulate parts with the advantage the parts can more easily be seen. In addition, the above compositions can be used to form films which will not crack or peel without concern as to the molecular weight of the components or their gel time. Thus, the addition of 1 to 3 weight percent water to a polyanhydride-monooxirane solution produces a solution which yields good films from resins which would otherwise crack and peel.

The use of water also has the advantage of decreasing the amount of monoepoxide volatilized during the cure when a low boiling monoepoxide such as epichlorohydrin is employed. This is true even when three percent water is employed which actually reduces the curing rate and thus might be expected to give rise to added volatilization.

It is believed that the hydroxyl-containing compounds react with and open up the anhydride groups in the polyanhydride and thus are a means for converting an alpha-olefin-maleic anhydride copolymer to an alpha-olefin-maleic anhydride-carboxylic acid terpolymer. In this terpolymer, there are two carboxylic acid groups on adjacent carbon atoms for every anhydride group converted.

The ratio of the polyanhydride to monoepoxide compound to employ in the compositions of this invention can vary over a wide range. The specific ratio to employ with any given polyanhydride or monoepoxide is determined, first of all, by whether a liquid solution of the polyanhydride in the monoepoxide is obtained at room temperature. The liquid solution of polyanhydride in the monoepoxide hardens by a crosslinking reaction, and the reaction product is a network of ester and ether linkages. The ester linkages are believed to form through the interaction of the anhydride and epoxide groups while the ether linkages are believed to form through the interaction of several epoxide groups. Where the liquid organic monomeric oxirane compound contains only one oxirane oxygen atom as its only functional group, one equivalent of the monooxirane compound is equivalent to one mole.

The anhydride equivalent of the polyanhydride is defined as the average number of anhydride groups per molecule. In the compositions of this invention, one mole of the polyanhydride has an anhydride equivalency of at least three, that is, the polyanhydride has at least three anhydride groups per molecule and can have as many as 100 groups per molecule as noted above. One epoxide group will react with one anhydride group. The polyanhydride group to epoxide group equivalent ratio, known more simply as the $A/E$ ratio, can suitably be between about 0.5:1 and 1.5:1, but is preferably between about 0.5:1 and about 1:1, and more preferably between 0.5:1 and 0.9:1 for the best physical and chemical properties.

One of the features of the liquid compositions of this invention is that they can be crosslinked or cured at relatively low temperatures and pressures. A hardening or curing of the resins can suitably be effected at a temperature between about 0° C. and 110° C. at atmospheric pressure. Higher pressures can be used if desired, but provide no additional benefits. Higher curing temperatures, for example, up to 200° C. or more can be used, but higher temperatures promote evaporation of one of the other of the components of the composition resulting in undesirable bubble formation or other difficulties. The preferred curing temperatures are between 50° C. and 100° C. Curing may take place in two stages, a first stage at a low temperature, and a second stage at a higher temperature.

The time for curing or hardening of the liquid compositions of this invention will vary over a wide range, depending on the reactivity of the particular monoepoxides, hydroxyl-containing compounds and polyanhydrides employed. In general, times of curing can vary between 1 minute and 24 hours at temperatures of 30° C. to 80° C. As noted above, these curing times can be reduced by the proper addition of defined amounts of methanol or water. When the water or methanol is employed, the curing times are generally between less than ½ minute and 4 hours.

This invention will be further described with relation to the following experimental work.

In the examples to follow, the polyanhydride compound was prepared by the copolymerization of maleic anhydride and hexene-1. This copolymer was prepared by reacting hexene-1 and maleic anhydride in a molar ratio of 2:1 in the liquid phase in the presence of a mutual solvent at a temperature between 60° C. and 100° C. using as a catalyst between one and three weight percent of benzoyl peroxide based on the maleic anhydride. The copolymer was then (1) separated from the solvent and any residual catalyst and (2) dried. Infrared analysis and nuclear magnetic resonance data show the olefin and maleic anhydride to have combined in a 1:1 molar ratio. The inherent viscosities of the copolymers measured by dissolving the copolymer in the ratio of 5 gm. to a deciliter of acetone measured at 77° F. was between 0.05 and 0.15 as used in the examples below. The "Initial Set Time" is defined as the time required for the liquid composition to set to a gel structure which will not flow but which is still tacky. Unless otherwise specified, the coatings were 3 mils thick.

EXAMPLE 1

Resin cure with butylene oxide plus tertiary amine

In the run for this example, a sufficient amount of a hexene-1-maleic anhydride copolymer having a molecular weight of 1850 was admixed with butylene oxide to form a solution having an $A/E$ ratio of 0.5. To this solution, was added three percent by weight of 3-picoline and curing occurred at room temperature. The "Initial Set Time" was 4 hours. The cured product had an amber color.

A series of runs was made repeating Example 1 except varying amounts of water were added to the polyanhydride-monoepoxide solution and allowed to react for 24 hours before the tertiary amine addition. The results of these runs are given in Table I below.

TABLE I

| Example No.: | Weight percent water | Initial set time, minutes | Color |
|---|---|---|---|
| 1 | 0.00 | 240 | Amber. |
| 2 | 0.25 | 75 | Light amber. |
| 3 | 0.50 | 60 | Do. |
| 4 | 0.75 | 45 | Very light amber. |
| 5 | 1.00 | 45 | Light straw. |

Another series of runs was made repeating Example 1 except varying amounts of water were added along with the tertiary amine. The results of these runs are given in Table II below.

TABLE II

| Example No.: | Weight percent water | Initial set time, minutes | Color |
|---|---|---|---|
| 1 | 0.00 | 240 | Amber. |
| 6 | 0.25 | 75 | Straw. |
| 7 | 0.50 | 75 | Do. |
| 8 | 0.75 | 75 | Do. |
| 9 | 1.00 | 120 | Do. |
| 10 | 3.00 | 210 | Light straw. |
| 11 | 5.00 | 405 | Do. |

A comparison of Examples 1–11 in Tables I and II shows the addition of water results in an improvement in color of the finally cured resin, no matter how the water is added. Examples 1–5 show the addition of water as a modifier, that is, where the water is allowed to react before the tertiary amine is added, results in an increased rate of cure. The data in Table II shows the addition of water together with the tertiary amine results in an increased rate of cure for the addition of small amounts of water (up to three weight percent). The addition of five weight percent of water (Example 11) results in a decreased rate of cure. The weight percent water in the above and following examples is based on the weight of the polyanhydride-monoepoxide solution.

Another series of runs was made repeating Example 1 except methanol in varying amounts was added as an additive along with the 3-picoline. The results of these runs are summarized in Table III below.

TABLE III

| Example No.: | Percent methanol added | Initial set time, minutes | Color |
|---|---|---|---|
| 1 | 0 | 240 | Amber. |
| 12 | 1 | 75 | Light amber. |
| 13 | 3 | 75 | Straw. |
| 14 | 5 | 60 | Clear colorless. |

The data in Table III shows the addition of methanol results in faster cure rates and also results in the production of lighter colored resins.

EXAMPLE 15

Example 1 was repeated except epichlorohydrin was used in place of butylene oxide. The "Initial Set Time" was 110 minutes and the color of the finally cured resin was black.

A series of runs was made repeating Example 15 except varying amounts of water were added to the polyanhydride-monoepoxide solution and allowed to react before the tertiary amine was added. The results of these runs are shown in Table IV below.

TABLE IV

| Example No.: | Weight percent water | Initial set time, minutes | Color |
|---|---|---|---|
| 15 | 0.00 | 110 | Black. |
| 16 | 0.25 | 75 | Dark brown. |
| 17 | 0.50 | 60 | Do. |
| 18 | 0.75 | 45 | Brown. |
| 19 | 1.00 | 45 | Light brown. |
| 20 | 2.00 | 165 | Amber. |
| 21 | 3.00 | 180 | Colorless. |

A comparison of Examples 15–21 shows the addition of water improves the color. The addition of water also improves the curing rate when the amount of water added is small or retards the curing (Examples 20–21) when larger amounts of water are added.

Another series of runs was made repeating Example 15 except varying amounts of water were added along with the tertiary amine. The results of these runs are given in Table V following.

TABLE V

| Example No.: | Weight percent water | Initial set time, minutes | Color |
|---|---|---|---|
| 15 | 0.00 | 110 | Black. |
| 22 | 0.25 | 120 | Dark amber. |
| 23 | 0.50 | 120 | Do. |
| 24 | 0.75 | 120 | Do. |
| 25 | 1.00 | 120 | Amber. |

The data in Table V shows the addition of water with the tertiary amine results in color improvement but the curing rate is slightly reduced.

It has also been found that the compositions of this invention are useful in forming smooth continuous films which otherwise might have bad etching and lifting characteristics. In addition, the presence of the water or methanol results in a considerable reduction in volatilization during curing.

EXAMPLE 26

In the run for this example a sufficient amount of a hexene-1-maleic anhydride copolymer having an intrinsic viscosity of 0.119 was admixed with epichlorohydrin to form a solution having an $A/E$ ratio of 0.5. To this solution was added 5 percent by weight 3-picoline. A 3 mil film was cast on aluminum and was cured at 28° C. for 24 hours. Considerable volatilization occurred during the curing resulting in a greater than 20 percent weight loss.

EXAMPLE 27

Example 26 was repeated except three percent water was added along with the 3-picoline. Only a 12 percent weight loss was suffered on curing.

In addition, the film formed in Example 26 was badly etched (cracked) and lifted from the surface. The film formed in Example 27 was smooth and continuous wtih no etching or lifting. When Example 27 was repeated except 0.5 and 1 percent by weight methanol was used in place of the water, smooth continuous films were obtained.

Resort may be had to such variations and modifications as fall within the spirit of the invention and the scope of the appended claims.

We claim:
1. A new composition capable of being cured to a solid infusible resin of improved color comprising a spreadable solution of
 (A) a solid compound containing at least three succinic anhydride groups and less than three conjugated double bonds when one of the conjugated double bonds is between the carbon atoms alpha to the carbonyl groups in a succinic anhydride group;
 (B) a liquid monooxirane compound having the general formula

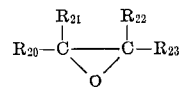

wherein $R_{20}$, $R_{21}$ and $R_{22}$ are selected from the group consisting of hydrogen; a saturated hydrocarbon radical; a saturated substituted hydrocarbon radical; and —OR, where R is any saturated hydrocarbon radical; and $R_{23}$ is selected from the group consisting of a saturated hydrocarbon radical; a saturated substituted hydrocarbon radical; and —OR, where R is any saturated hydrocarbon radical;
 (C) a soluble tertiary amine; and
 (D) a hydroxyl-containing compound selected from the group consisting of water and methanol,
wherein the equivalent ratio of (A) to (B) is between 0.5 and 1.5 with component (D) being present in an amount between 0.1 and 3 weight percent of the solution when (D) is water and in an amount between 0.1 and 5 weight percent of the solution when (D) is methanol.

2. The composition of claim 1 in which the solid compound (A) is a copolymer of a straight chain mono-alpha-olefin having from about 6 to about 14 carbon atoms, and a derivative of succinic anhydride having monoolefinic carbon-to-carbon unsaturation, with component (C) being present in an amount of between 0.5 and 5 parts per hundred parts of the solution and component (D) being present in an amount between 0.1 and 5 weight percent of the solution.

3. The composition of claim 2 in which component (D) is water.

4. The composition of claim 2 in which component (D) is methanol.

5. A method of controlling the rate of curing of a composition comprising
   (A) a solid compound containing at least three succinic anhydride groups and less than three conjugated double bonds when one of the conjugated double bonds is between the carbon atoms alpha to the carbonyl groups in a succinic anhydride group;
   (B) a liquid monooxirane compound having the general formula

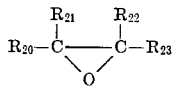

wherein $R_{20}$, $R_{21}$ and $R_{22}$ are selected from the group consisting of hydrogen; a saturated hydrocarbon radical; a saturated substituted hydrocarbon radical; and —OR, where R is any saturated hydrocarbon radical; and $R_{23}$ is selected from the group consisting of a saturated hydrocarbon radical; a saturated substituted hydrocarbon radical; and —OR, where R is any saturated hydrocarbon radical;
   (C) a soluble tertiary amine; and
   (D) a hydroxyl-containing compound selected from the group consisting of water and methanol,
which comprises adding said components (C) and (D) to a liquid solution of said components (A) and (B).

6. A method according to claim 5 for increasing the curing rate which comprises
   (1) admixing said components (A) and (B) to form a first liquid solution;
   (2) adding to said first liquid solution a hydroxyl compound selected from the group consisting of water and methanol to form a second liquid solution, said water being added in an amount between 0.1 and 1 weight percent of said first liquid solution and said methanol being added in an amount between 0.1 and 5 weight percent of said first liquid solution; and
   (3) adding said soluble tertiary amine to said second liquid solution after the hydroxyl-containing compound has been allowed to react.

7. A method according to claim 5 for increasing the rate of curing wherein the hydroxyl-containing compound is added simultaneously with the tertiary amine and the component (B) is butylene oxide.

8. A method of reducing the rate of curing and improving the color of a composition comprising
   (A) a solid compound containing at least three succinc anhydride groups and less than three conjugated double bonds when one of the conjugated double bonds is between the carbon atoms alpha to the carbonyl groups in a succinic anhydride group;
   (B) a liquid monooxirane compound having the general formula

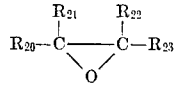

wherein $R_{20}$, $R_{21}$ and $R_{22}$ are selected from the group consisting of hydrogen; a saturated hydrocarbon radical; a saturated substituted hydrocarbon radical; and —OR, where R is any saturated hydrocarbon radical; and $R_{23}$ is selected from the group consisting of a saturated hydrocarbon radical; a saturated substituted hydrocarbon radical; and —OR, where R is any saturated hydrocarbon radical;
   (C) a soluble tertiary amine; and
   (D) water
which comprises admixing (A) and (B) to form a liquid solution and thereafter simultaneously adding to said liquid solution a soluble tertiary amine and water, said water being present in an amount from 1 to 3 weight percent of said solution.

9. A method of reducing the curing time and improving the color of a composition comprising
   (A) a solid compound containing at least three succinic anhydride groups and less than three conjugated double bonds when one of the conjugated double bonds is between the carbon atoms alpha to the carbonyl groups in a succinic anhydride group;
   (B) a liquid monooxirane compound having the general formula

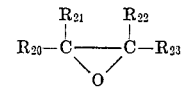

wherein $R_{20}$, $R_{21}$ and $R_{22}$ are selected from the group consisting of hydrogen; a saturated hydrocarbon radical; a saturated substituted hydrocarbon radical; and —OR, where R is any saturated hydrocarbon radical; and $R_{23}$ is selected from the group consisting of a saturated hydrocarbon radical; a saturated substituted hydrocarbon radical; and —OR, where R is any saturated hydrocarbon radical;
   (C) a soluble tertiary amine; and
   (D) water which comprises
      (1) admixing components (A) and (B) to form a first liquid solution;
      (2) adding water to said first liquid solution in an amount between 1 and 3 weight percent of said first solution to form a second liquid solution, and
      (3) adding said soluble tertiary amine to said second liquid solution after the water has been allowed to react.

10. A composition according to claim 1 wherein component (B) is epichlorohydrin.

11. The cured reaction product of the composition claimed in claim 2.

12. A method according to claim 8 wherein the monooxirane compound is epichlorohydrin and the water is present in an amount from 0.1 to 3 weight percent of said solution.

13. A method of improving the film forming ability of a composition comprising
   (A) a solid compound containing at least three succinic anhydride groups and less than three conjugated double bonds when one of the conjugated double bonds is between the carbon atoms alpha to the carbonyl groups in a succinic anhydride group;
   (B) a liquid monooxirane compound having the general formula

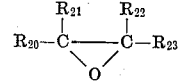

wherein $R_{20}$, $R_{21}$ and $R_{22}$ are selected from the group consisting of hydrogen; a saturated hydrocarbon radical; a saturated substituted hydrocarbon radical; and —OR, where R is any saturated hydrocarbon radical; and $R_{23}$ is selected from the group consisting of a saturated hydrocarbon radical; a saturated substituted hydrocarbon radical; and —OR, where R is any saturated hydrocarbon radical; and
   (C) a soluble tertiary amine
which comprises adding component (C) and a hydroxyl-containing compound selected from the group consisting of water or methanol to a liquid solution of said components (A) and (B).

References Cited

UNITED STATES PATENTS

| | | | |
|---|---|---|---|
| 2,822,350 | 2/1958 | Hayes | 260—78.4(EP)UX |
| 3,089,863 | 5/1963 | Hicks et al. | 260—75(EP) |
| 3,254,060 | 5/1966 | Connolly et al. | |
| 3,370,043 | 2/1968 | Milligan | 260—78.4(EP)X |
| 3,374,209 | 3/1968 | Hay et al. | 260—78.4(EP) |
| 3,374,286 | 3/1968 | Hicks | 260—78.4(EP)X |

OTHER REFERENCES

Lee, Henry Epoxy Resins; Their Applications and Technology. New York, McGraw-Hill, 1957, pp. 48–51.

PHILIP E. ANDERSON, Primary Examiner

U.S. Cl. X.R.

260—75, 78.4